US012116849B2

(12) United States Patent
Al-Hannabi et al.

(10) Patent No.: US 12,116,849 B2
(45) Date of Patent: Oct. 15, 2024

(54) IN-PIPE PASSIVE CENTERING MECHANISM WITH RADIAL PROBE OR TOOL DEPLOYMENT MECHANISM

(71) Applicant: Saudi Arabian Oil Company, Dhahran (SA)

(72) Inventors: Abdoulelah Al-Hannabi, Thuwal (SA); Mohamed Abdelkader, Thuwal (SA); Hassane Trigui, Thuwal (SA); Sahejad Patel, Thuwal (SA); Fadl Abdellatif, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 724 days.

(21) Appl. No.: 17/330,541

(22) Filed: May 26, 2021

(65) Prior Publication Data

US 2021/0332649 A1    Oct. 28, 2021

Related U.S. Application Data

(63) Continuation of application No. 16/574,642, filed on Sep. 18, 2019, now Pat. No. 11,047,179.

(51) Int. Cl.
*E21B 17/10* (2006.01)
*F16L 55/44* (2006.01)
*F16L 101/30* (2006.01)

(52) U.S. Cl.
CPC ...... *E21B 17/1021* (2013.01); *E21B 17/1078* (2013.01); *F16L 55/44* (2013.01); *F16L 2101/30* (2013.01)

(58) Field of Classification Search
CPC ............. E21B 17/1021; E21B 43/1057; E21B 43/1078; E21B 17/1057; E21B 17/1078;
(Continued)

(56) References Cited

U.S. PATENT DOCUMENTS 1,895,643 A * 1/1933 Putnam ..................... G01B 7/06
                                                439/38
4,964,759 A * 10/1990 Guzzetta ................. F16L 55/26
                                                405/303
(Continued)

FOREIGN PATENT DOCUMENTS

EP       0083759 A2    7/1983
EP       2813800 A1   12/2014
(Continued)

OTHER PUBLICATIONS

International Search Report and Written Opinion in Corresponding PCT Application No. PCT/US2020/050955 mailed Dec. 22, 2020. 11 pages.

*Primary Examiner* — Kenneth L Thompson
(74) *Attorney, Agent, or Firm* — Leason Ellis LLP

(57) ABSTRACT

An in-pipe apparatus for pipe inspection or maintenance is provided. The apparatus includes: a rotational deployment mechanism to rotationally deploy a probe or tool about an inner circumference of a pipe with respect to an axis of rotation; a radial deployment mechanism to radially deploy the probe or tool in a radial direction from the axis of rotation toward a target point on the inner circumference; and a passive centering mechanism to passively align the axis of rotation with the axis of the pipe. In some embodiments, the rotational deployment mechanism includes a motor to rotate the radial deployment mechanism about the axis of rotation. In some embodiments, the apparatus further includes a longitudinal deployment mechanism to longitudinally deploy the probe or tool along the pipe axis, with the passive centering mechanism passively maintaining alignment of the axis of rotation with the pipe axis during the longitudinal deployment.

19 Claims, 8 Drawing Sheets

(58) Field of Classification Search
CPC ....... F16L 2101/30; F16L 55/40; F16L 55/44; G01B 17/02; G01B 17/025; G01B 7/06
See application file for complete search history.

(56) References Cited

U.S. PATENT DOCUMENTS

| | | | |
|---|---|---|---|
| 6,107,795 | A | 8/2000 | Smart |
| 6,378,627 | B1 | 4/2002 | Tubel et al. |
| 7,131,344 | B2 | 11/2006 | Tarumi |
| 7,505,063 | B1 | 3/2009 | Bastedo et al. |
| 7,768,270 | B2 * | 8/2010 | Brusco ................ G01B 21/08 |
| | | | 324/559 |
| 7,975,541 | B2 * | 7/2011 | Large ................ E21B 17/1021 |
| | | | 166/241.5 |
| 8,390,278 | B2 | 3/2013 | Petrosky |
| 8,468,882 | B2 * | 6/2013 | Anish ..................... G01V 3/20 |
| | | | 73/152.02 |
| 9,933,329 | B2 | 4/2018 | Hansen |
| 10,724,669 | B1 * | 7/2020 | Al-Hannabi .......... G01B 17/02 |
| 11,047,179 | B2 * | 6/2021 | Al-Hannabi ........ E21B 17/1021 |
| 11,821,566 | B2 * | 11/2023 | Takashima ............. F16L 55/44 |
| 2023/0243220 | A1 * | 8/2023 | Fanini ................ E21B 17/1021 |
| | | | 166/241.5 |

FOREIGN PATENT DOCUMENTS

| | | | |
|---|---|---|---|
| GB | 2301162 | A | 11/1996 |
| JP | 2566236 | B2 | 10/1988 |
| JP | H0257974 | A | 2/1990 |
| JP | 2643492 | B2 | 7/1991 |
| JP | 6087857 | U | 6/1993 |

* cited by examiner

IN-PIPE PASSIVE CENTERING MECHANISM WITH RADIAL PROBE OR TOOL DEPLOYMENT MECHANISM

CROSS-REFERENCE TO RELATED APPLICATION

The present application claims the benefit of and priority to U.S. patent application Ser. No. 16/574,642, titled IN-PIPE PASSIVE CENTERING MECHANISM WITH RADIAL PROBE OR TOOL DEPLOYMENT MECHANISM, filed on Sep. 18, 2019, which is hereby incorporated by reference in its entirety.

FIELD OF THE DISCLOSURE

The present disclosure relates to pipeline sensing and maintenance in general, and specifically to a pipeline apparatus having an in-pipe passive centering mechanism with a radial probe or tool deployment mechanism.

BACKGROUND OF THE DISCLOSURE

In the field of automated pipeline technology, in-pipe inspections and maintenance can be challenging tasks as they can require certain functions to be executed in a limited space using remotely operated or autonomous robots and crawlers. Crawlers equipped with sensory features and maintenance tools drive inside the pipe and perform certain tasks at specific locations. It can be important to ensure proper deployment of sensor probes and tool heads to achieve reliable output. In-pipe tasks often require perpendicular deployment of probes and tools with respect to the inner walls of the pipeline in order to achieve consistent data and results. However, this can be difficult to reliably achieve with robotic systems given the different pipe schedules (e.g., different internal diameters), the various sizes of pipes, and the negotiation of interior obstacles such as going through weld beads.

It is in regard to these and other problems in the art that the present disclosure is directed to provide a technical solution for an effective pipeline apparatus having an in-pipe passive centering mechanism with a radial probe or tool deployment mechanism.

SUMMARY OF THE DISCLOSURE

According to an embodiment, an in-pipe apparatus to inspect or maintain a pipe is provided. The apparatus includes: a rotational deployment mechanism to rotationally deploy a probe or tool about an inner circumference of the pipe with respect to an axis of rotation; a radial deployment mechanism to radially deploy the probe or tool in a radial direction from the axis of rotation toward a target point on the inner circumference of the pipe; and a passive centering mechanism to passively align the axis of rotation with the axis of the pipe.

In an embodiment, the apparatus further includes a longitudinal deployment mechanism to longitudinally deploy the probe or tool in a longitudinal direction along the axis of the pipe.

In an embodiment, a diameter of the pipe varies in the longitudinal direction, and the passive centering mechanism passively maintains alignment of the axis of rotation with the axis of the pipe across the varying pipe diameter during the longitudinal deployment of the probe or tool.

In an embodiment, the rotational deployment mechanism includes a motor to rotate the radial deployment mechanism about the axis of rotation.

In an embodiment, the target point includes a plurality of target points on the inner circumference of the pipe at a corresponding plurality of radial directions from the axis of rotation, and the rotational deployment mechanism is further to rotationally deploy the probe or tool to each of the radial directions while the passive centering mechanism passively maintains alignment of the axis of rotation with the axis of the pipe and the radial deployment mechanism radially deploys the probe or tool toward a corresponding one of the target points.

In an embodiment, the radial deployment mechanism includes: a first slider to hold the probe or tool; a first linear guide to linearly guide the first slider in the radial direction; and a linear actuator to linearly actuate the first slider along the first linear guide, to radially deploy the probe or tool in the radial direction.

In an embodiment, the radial deployment mechanism further includes: a spring held by the first slider at a first point of attachment; a second slider to hold the spring at a second point of attachment; and a second linear guide to linearly guide the second slider in the radial direction, wherein the linear actuator is further to linearly actuate the second slider along the second linear guide, to radially deploy the probe or tool in the radial direction until the probe or tool touches the target point and the spring exerts a desired amount of force on the probe or tool in the radial direction against the target point.

In an embodiment, the linear actuator directly linearly actuates the second slider along the second linear guide, and the linear actuator indirectly linearly actuates the first slider along the first linear guide through compression or tension in the spring.

In an embodiment, the passive centering mechanism includes legs and a spring, the legs are configured to make at least three points of contact with an inside wall of the pipe, and the spring is configured to exert outward force on the legs and against the inside wall of the pipe sufficient to passively align the axis of rotation with the axis of the pipe.

In an embodiment, the legs include wheels to longitudinally deploy the probe or tool in a longitudinal direction along the axis of the pipe, a diameter of the pipe varies in the longitudinal direction, and the outward force exerted by the spring is further sufficient to passively maintain alignment of the axis of rotation with the axis of the pipe across the varying pipe diameter during the longitudinal deployment of the probe or tool.

According to another embodiment, a method of in-pipe inspection or maintenance of a pipe is provided. The method includes: automatically rotationally deploying a probe or tool about an inner circumference of the pipe with respect to an axis of rotation; radially deploying, using a radial deployment mechanism, the probe or tool in a radial direction from the axis of rotation toward a target point on the inner circumference of the pipe; and passively aligning the axis of rotation with the axis of the pipe.

In an embodiment, the method further includes automatically longitudinally deploying the probe or tool in a longitudinal direction along the axis of the pipe.

In an embodiment, a diameter of the pipe varies in the longitudinal direction, and passively aligning the axis of rotation includes passively maintaining alignment of the axis of rotation with the axis of the pipe across the varying pipe diameter during the longitudinal deployment of the probe or tool.

In an embodiment, rotationally deploying the probe or tool includes rotating the radial deployment mechanism about the axis of rotation using a motor.

In an embodiment, the target point includes a plurality of target points on the inner circumference of the pipe at a corresponding plurality of radial directions from the axis of rotation, and rotationally deploying the probe or tool further includes rotationally deploying the probe or tool to each of the radial directions while passively maintaining alignment of the axis of rotation with the axis of the pipe and the radial deployment mechanism radially deploys the probe or tool toward a corresponding one of the target points.

In an embodiment, radially deploying the probe or tool includes: holding the probe or tool with a first slider; and linearly actuating the first slider in the radial direction along a first linear guide.

In an embodiment, radially deploying the probe or tool further includes: holding a spring with the first slider and with a second slider; and linearly actuating the second slider in the radial direction along a second linear guide until the probe or tool touches the target point and the spring exerts a desired amount of force on the probe or tool in the radial direction against the target point.

In an embodiment, actuating the first and second sliders includes: directly linearly actuating the second slider along the second linear guide, and indirectly linearly actuating the first slider along the first linear guide through compression or tension in the spring.

In an embodiment, passively aligning the axis of rotation includes: making at least three points of contact with legs against an inside wall of the pipe, and exerting outward force with a spring on the legs and against the inside wall of the pipe sufficient to passively align the axis of rotation with the axis of the pipe.

In an embodiment, the method further includes automatically longitudinally deploying the probe or tool in a longitudinal direction along the axis of the pipe using wheels that are part of the legs, wherein a diameter of the pipe varies in the longitudinal direction, and exerting the outward force with the spring is further sufficient to passively maintain alignment of the axis of rotation with the axis of the pipe across the varying pipe diameter during the longitudinal deployment of the probe or tool.

Any combinations of the various embodiments and implementations disclosed herein can be used. These and other aspects and features can be appreciated from the following description of certain embodiments and the accompanying drawings and claims.

Figure 1:
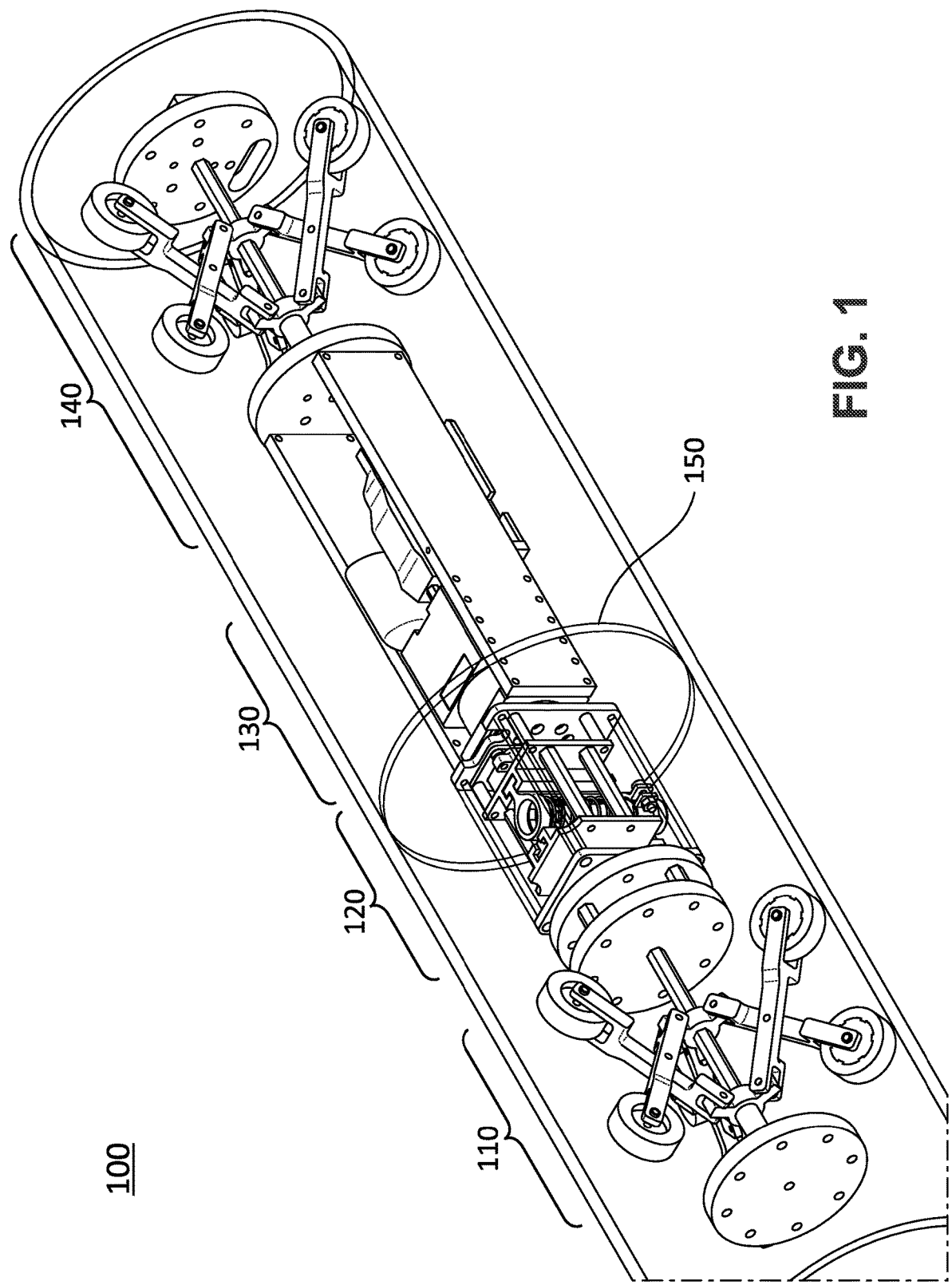
FIG. 1 is an oblique cutaway view of an example pipeline apparatus having an in-pipe passive centering mechanism with a radial deployment mechanism for a probe or tool, according to an embodiment.

It is noted that the drawings are illustrative and not necessarily to scale.

DETAILED DESCRIPTION OF CERTAIN EMBODIMENTS OF THE DISCLOSURE

Example embodiments of the present disclosure are directed to an automated pipeline apparatus having an in-pipe passive centering mechanism with a radial probe or tool deployment mechanism. In one such embodiment, simple and efficient mechanisms to center and actuate the probe or tool inside a small diameter pipe are provided. This technique has less complexity than comparable automated approaches. In this technique, the probe or tool is deployed radially (e.g., towards the pipe inner wall) by attaching the probe or tool to a linear guide coupled with a spring that is actuated by a linear actuator. Further, the radial deployment mechanism is supported by a rotational deployment mechanism whose axis of rotation coincides with the axis of the pipe (e.g., line going through the center of the pipe) by a passively adaptable centering mechanism using another spring. Together, the rotational deployment, radial deployment, and centering mechanisms make sure that the probe or tool is deployed properly (e.g., perpendicular to the tangent line of the pipe inside wall), even for varying pipe sizes. The three mechanisms also ensure proper measurement and deployment around the internal circumference of the pipe. Furthermore, when the linear actuator extends radially, the probe or tool deploys until it touches the inside of the pipe, and the spring absorbs any additional load experienced by the probe or tool while ensuring reliable deployment.

As discussed earlier, in-pipe inspection and maintenance can be a rigorous task as it can require certain functions to be executed in a limited space using remotely operated or autonomous robots or crawlers. Compounding these challenges includes the need for proper deployment of the probes and tool heads to achieve desired output. Other ways of addressing these concerns can rely on manual deployment of the probe or tool, or manual centering of the probe or tool (e.g., to a specific pipe schedule), or actuated centering support, where a pneumatic actuator performs the centering. These approaches require manual intervention (and loss of accuracy) or more operating components and complexity compared to automated techniques disclosed herein.

Accordingly, in an example embodiment, a pipeline apparatus having a rotation motor and a linear actuator to deploy probes and tools is provided. The pipeline apparatus uses a passively adaptable centering mechanism to center the axis of rotation of the rotation motor with the axis of the pipe. This ensures the linear actuator radially deploys the probe or tool consistently (e.g., perpendicularly including substantially perpendicular within a few degrees of 90 degrees) to any point on the inside surface of the pipe, and without using any active centering (such as with a motor, or with a guided electrical or pneumatic system, or by a manual procedure).

Here, perpendicular is with respect to a tangent line going through a target point on an inside of the pipe, plus or minus a few degrees, for instance, perpendicular can include 85 to 95 degrees. The pipeline apparatus thus combines a centering mechanism and a radial probe or tool deployment mechanism. The radial probe or tool deployment mechanism uses a spring for reliable probe and tool deployment. The radial probe or tool deployment mechanism also uses a linear guide and an actuator to radially actuate the probe or tool. In addition, the pipeline apparatus aligns the axis of rotation of a rotation motor to the pipe axis to ensure reliable deployment of the probe or tool.

Throughout, a dry film thickness (DFT) probe is used and illustrated as an example probe or tool for use with some embodiments. Such a digital coating thickness gauge can use magnetic and eddy current principles to measure the coating thickness on ferrous and non-ferrous metals using a probe. However, this probe should be deployed perpendicularly on the surface of interest to take a reliable measurement, within the range of "perpendicular" noted previously. While the DFT probe is used throughout for convenience of description, other embodiments are not so limited. For example, in some embodiments, other probes (such as an ultrasonic thickness probe) or tools serve as example probes or tools for in-pipe passive centering and radial deployment. Such pipeline apparatuses are able to take reliable readings (or reliably deploy tools) in different pipe schedules, with the probe or tool being rotationally deployed in conjunction with a centering mechanism such that the probe or tool can be rotated evenly distanced from the pipe wall. Changing pipe schedules or sizes causes a passive re-centering of the apparatus such that the probe or tool still rotates at an even distance (spacing) from the pipe wall. As such, the centering mechanism ensures that the probe or tool holder is centered and deploys properly in all applicable sizes of pipe.

In an embodiment, an automated pipeline apparatus employs several mechanical systems, including a rotation mechanism for rotational deployment of a probe or tool within a pipe, a centering mechanism to center the rotation mechanism passively inside the pipe (e.g., with respect to the pipe axis, such as aligning the axis of rotation of the rotation mechanism with the pipe axis), a radial deployment mechanism for radially deploying the probe or tool onto the pipe wall to take the measurement or perform the tool operation, and a longitudinal deployment mechanism (e.g., wheels and a motor) to move the probe or tool longitudinally along the inside of the pipe. The centering mechanism further maintains the centering (e.g., alignment of the axis of rotation of the rotation mechanism with the pipe axis) during the longitudinal deployment, even when the inside pipe diameter changes or varies in the longitudinal direction.

FIG. 1 is an oblique cutaway view of an example pipeline apparatus 100 having an in-pipe passive centering mechanism 110 with a radial probe or tool deployment mechanism 120, according to an embodiment. The pipeline apparatus 100 further includes a rotational deployment mechanism 130 (e.g., a servo motor) and a longitudinal deployment mechanism 140 (e.g., including another passive centering mechanism, or part of the existing passive centering mechanism).

In further detail, the passive centering mechanism 110 is illustrated as a tri-wheel (three sets of wheels) configuration, each wheel set offset 120° from the other wheel sets in the rotational dimension of the inside pipe. Equal outward force against the inside wall of the pipe is exerted by each of the wheel sets, to center the apparatus 100 regardless of pipe diameter. The wheel sets also permit movement of the apparatus in the longitudinal dimension. Since the centering mechanism 110 is passive, there are no motors or guided (or manual) steps involved in the centering. Instead, simple mechanical forces are used for the centering, such as springs, as illustrated in the embodiments illustrated and discussed below in connection with FIGS. 2A, 2B, 3, 4 and the further embodiment in FIG. 7.

The radial deployment mechanism 120 deploys a probe or tool in the radial dimension inside the pipe. As such, the radial deployment mechanism 120 includes, in one embodiment, a linear actuator to deploy the probe or tool in a radial direction (e.g., from the axis of the pipe to a target point on a deployment circumference 150 of the inner pipe). The radial deployment of the probe or tool is perpendicular to the target point on the deployment circumference 150 (such as perpendicular to a tangent line of the deployment circumference 150 at the target point). Further details are described in connection with FIGS. 5 and 6 below.

The rotational deployment mechanism 130 rotationally deploys the probe or tool about an axis of rotation that is aligned to the pipe axis by the passive centering mechanism 110. For example, the rotational deployment mechanism 130 can be a servo motor coupled to the radial deployment mechanism 120 and that rotates the radial deployment mechanism 120 about the pipe axis to reach the desired amount of rotation (while tracing the deployment circumference 150 of the probe or tool in the process).

The longitudinal deployment mechanism 140 (such as a motor and wheels) moves the apparatus 100, including the probe or tool, longitudinally along the inside of the pipe (in the direction of the pipe axis, or in the longitudinal dimension). The longitudinal deployment mechanism 140 can adjust the deployment circumference 150 of the probe or tool through this longitudinal deployment or movement. For example, in an embodiment, the longitudinal deployment mechanism includes a motor to rotate one or more axles that drive a corresponding one or more sets of wheels (along with the rest of the apparatus 100) in the longitudinal direction. As an example, the longitudinal movement of the apparatus 100 can be for a set or predetermined distance, or to a set or predetermined location, or the like. Together, the longitudinal deployment mechanism 140 in combination with the radial deployment mechanism 120 and rotational deployment mechanism 130 (as centered or aligned by the passive centering mechanism 110) can allow the probe or tool to deploy consistently (e.g., perpendicularly) and reliably to any point on the inside of the pipe.

Figure 2A:
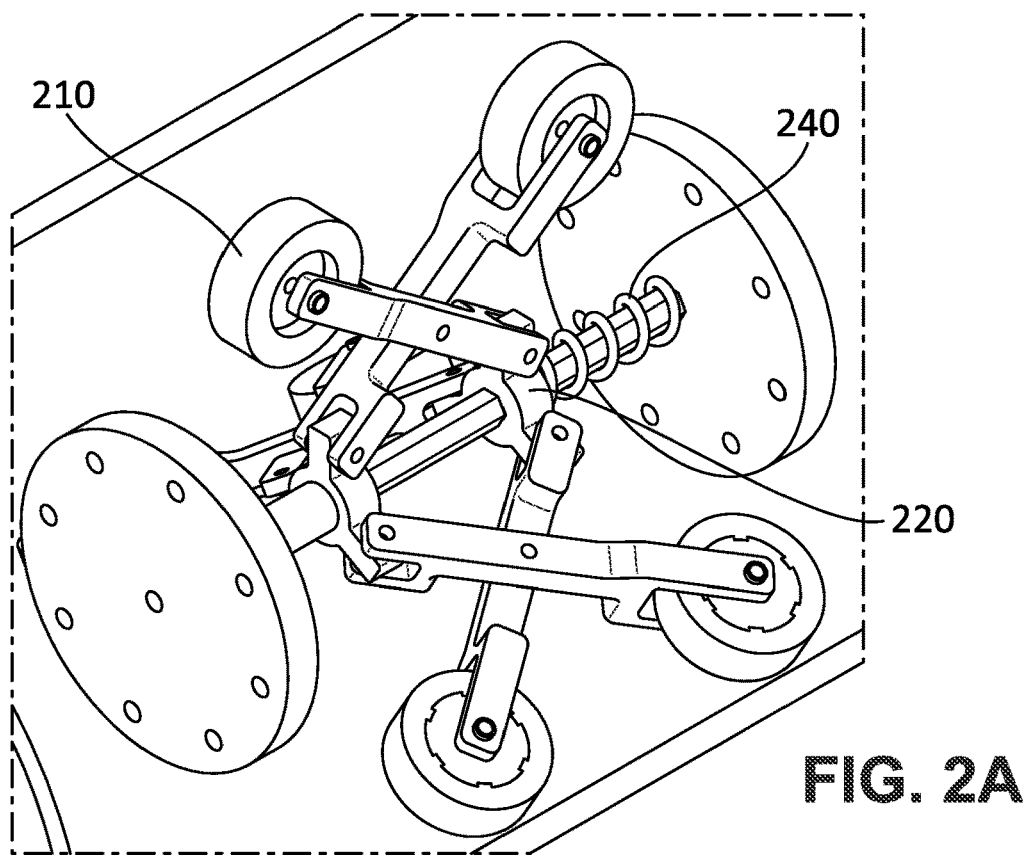
FIGS. 2A-2B are oblique cutaway views in different size pipes of an example in-pipe passive centering mechanism, such as for use with the pipeline apparatus of FIG. 1, according to an embodiment.
Figure 2B:
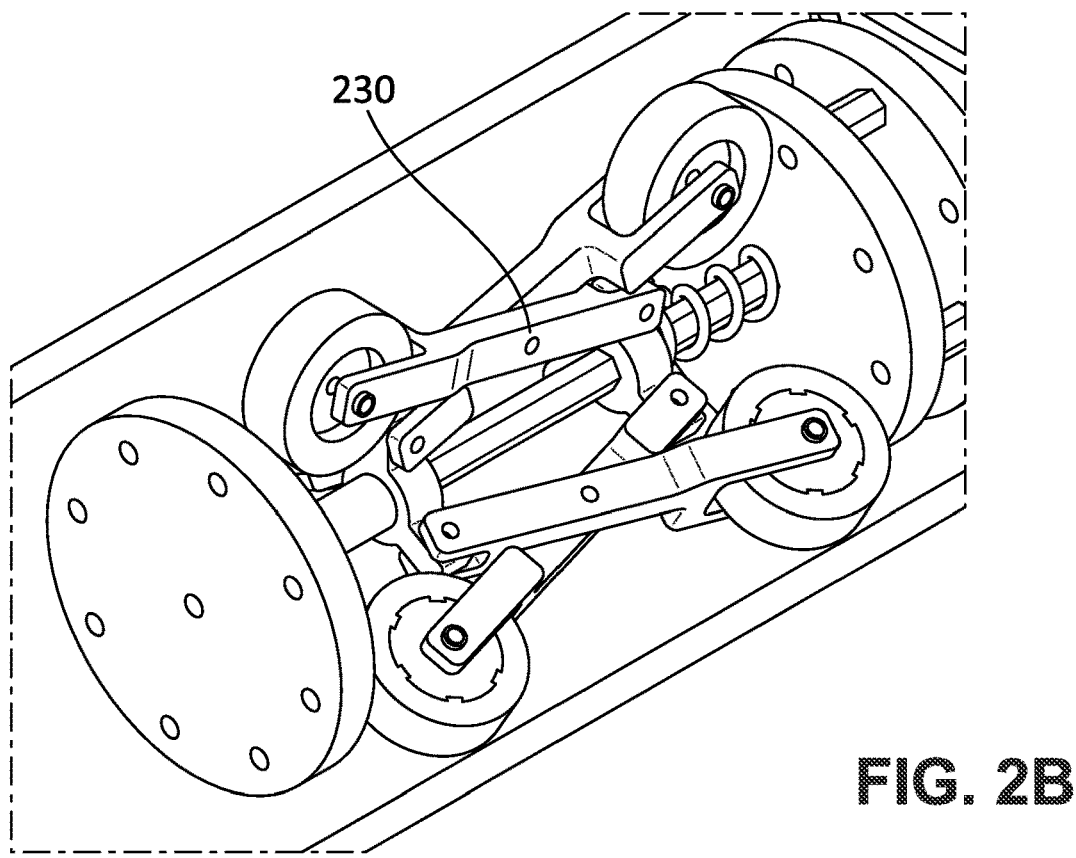

FIGS. 2A-2B are oblique cutaway views in different size pipes of an example in-pipe passive centering mechanism, such as the passive centering mechanism 110 for use with the pipeline apparatus 100 of FIG. 1, according to an embodiment. The passive centering mechanism includes wheels 210 arranged in three sets of two wheels apiece (six wheels total), each wheel set being offset 120° from each other about the pipe axis. The wheels 210 are connected by supports or legs (one wheel per leg, six legs total) to two sliding rings 220 (three wheels per sliding ring, one from each wheel set) along an axle aligned with the axis of the pipe.

The two legs (or supports) of each wheel set are further connected to each other at a pivot point 230 to allow the wheel set to expand or contract in order to adjust to the inside pipe diameter. FIG. 2A illustrates the wheel sets expanded for a large diameter pipe while FIG. 2B illustrates the wheel sets contracted for a small diameter pipe. A compression spring 240 exerts inward longitudinal force on the sliding ring 220 to expand the wheel sets to fit the inside diameter of the pipe. Put another way, the sliding rings 220, legs, and pivot points 230 convert the inward longitudinal force of the compression spring 240 to an outward force on each of the wheels 210 against the inside wall of the pipe. This passively centers or aligns the axle of the centering mechanism with the pipe axis, regardless of the pipe diameter or schedule. Strictly speaking, the passive centering mechanism is constrained to a certain minimum size and a certain maximum size, but that range is adjustable depending on factors such as length of the legs, location of the pivot points 230, strength of the compression spring 240, and the like. As such, for ease of description, the range is treated as unbounded.

Before inserting the centering mechanism inside a pipe, the compression spring 240 keeps the two wheels 210 of each wheel set at the maximum extended position, which needs to be larger than the maximum inner pipe diameter for which passive centering is to be accomplished. Once the centering mechanism is inserted inside the pipe, all the supporting links (or legs) push together the sliding rings 220. This ensures the centricity of the shaft and module. Hence, the sliding rings 220 compress the spring 240 and this compression provides the required force to keep the wheels 210 attached to the pipe walls and to keep the module centered. It should be noted that in some embodiments, the spring 240 itself can be tuned to control the force delivered, such as using a stronger or weaker spring to get a more desired force.

Figure 3:
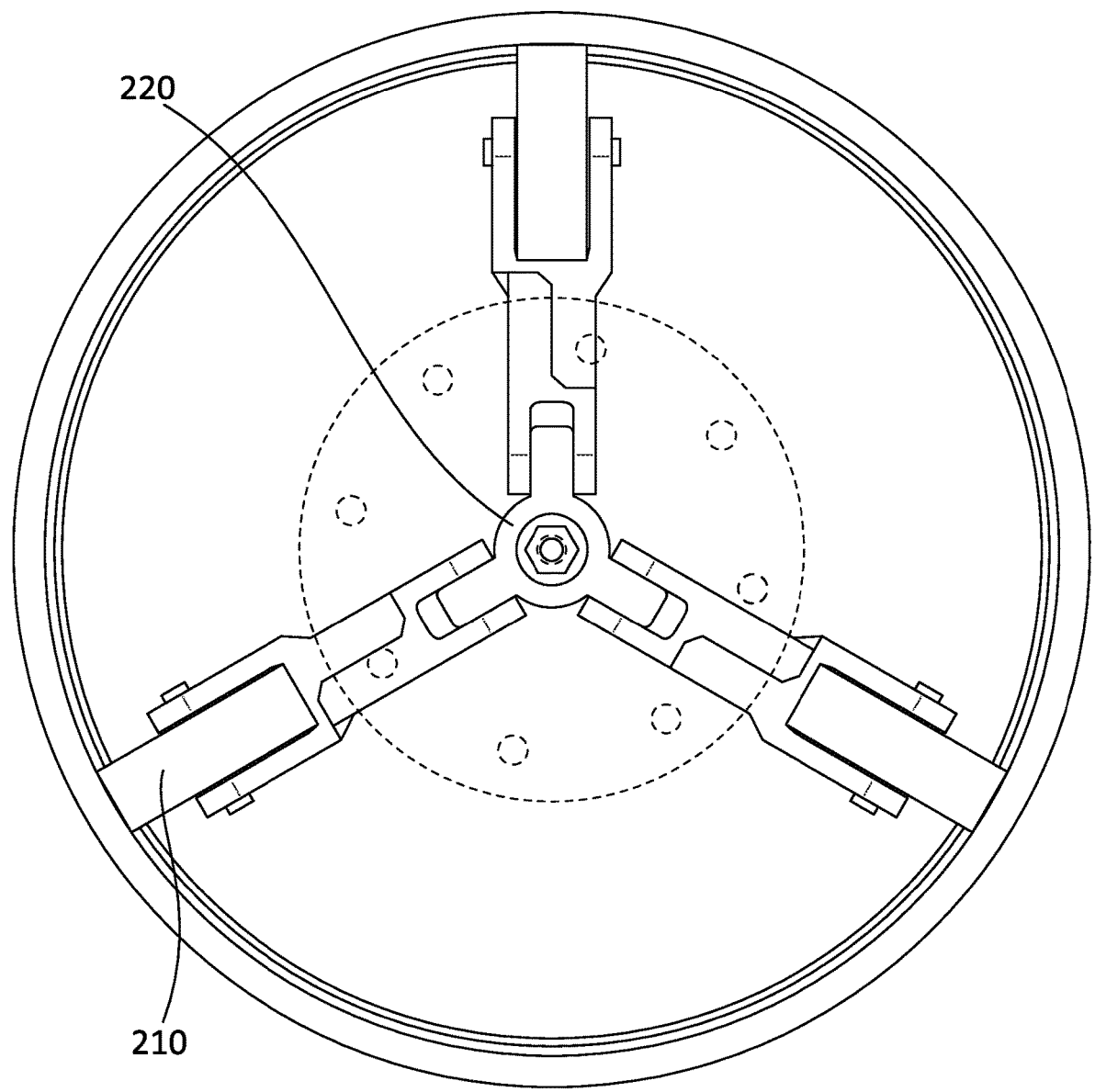
FIG. 3 is a cross-sectional cutaway view of the in-pipe passive centering mechanism of FIGS. 2A-2B.

FIG. 3 is a cross-sectional cutaway view of the in-pipe passive centering mechanism of FIGS. 2A-2B. Because of the orientation, the wheel sets in FIG. 3 each appear as single wheels 210, and only one sliding ring 220 is visible as well. The passive centering mechanism of FIGS. 2A-3 is built on a tri-wheel configuration, as visible in FIG. 3. By building a symmetric pattern of wheel sets about the pipe axis, the outward force attributed to the compression spring 240 is opposed by comparable opposite forces exerted by the inside wall of the pipe, which centers the mechanism with respect to the pipe axis. In other embodiments, the design is adapted for additional numbers of wheel sets (e.g., to have more rigid support) or different symmetries about the pipe axis. The design is primarily based on a four-bar linkage mechanism, where all the wheel supports (or legs) have the same length and are coupled with one compression spring 240 which pushes them simultaneously to attach to the inner wall of the pipe and thereby achieve centering. This mechanism is designed to go through (pass over) weld beads and different pipeline schedules without manual adjustment or actuation, all while still maintaining centering or alignment with the pipe axis.

Figure 4:
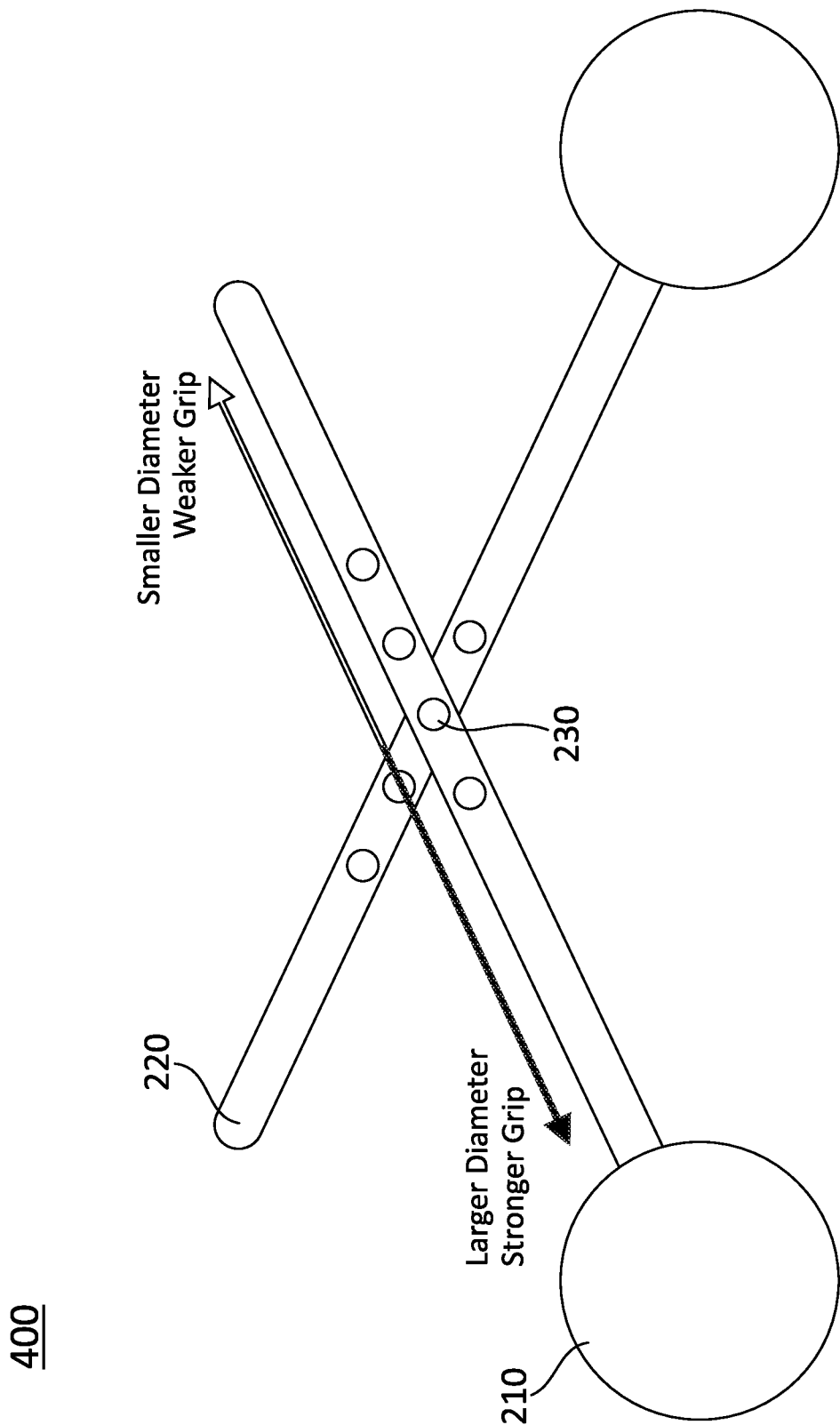
FIG. 4 is a schematic diagram of an example pivot point adjustment mechanism, such as for use with the in-pipe passive centering mechanism of FIGS. 2A-3, according to an embodiment.

FIG. 4 is a schematic diagram of an example pivot point adjustment mechanism 400, such as for use with the in-pipe passive centering mechanism of FIGS. 2A-3, according to an embodiment. For ease of description, FIG. 4 is described and illustrated in terms of the passive centering mechanism of FIGS. 2A-3, including wheels 210, sliding ring attachments 220, and pivot points 230. The legs (support links) in the pivot point adjustment mechanism 400 each have four slots for possible pivot point locations. In other embodiments, different numbers of slots (or variably-sized pivot point attachments) are provided. If, for example, a stronger or weaker grip (or force on the inside wall of the pipe) is desired, the pivot point 230 can be adjusted to acquire different grip strengths (force levels). For example, moving the pivot point 230 closer to the wheels 210 produces a stronger grip (larger force on the inside wall), while moving the pivot point 230 closer to the sliding ring attachments 220 produces a weaker grip (smaller force on the inside wall). Likewise, when the centering mechanism is inserted inside a different pipe size, an equivalent grip force can be maintained by adjusting the pivot points 230 of the support links (e.g., closer to the wheels 210 when moving to a larger pipe size, and closer to the sliding rings 220 when moving to a smaller pipe size).

Figure 5:
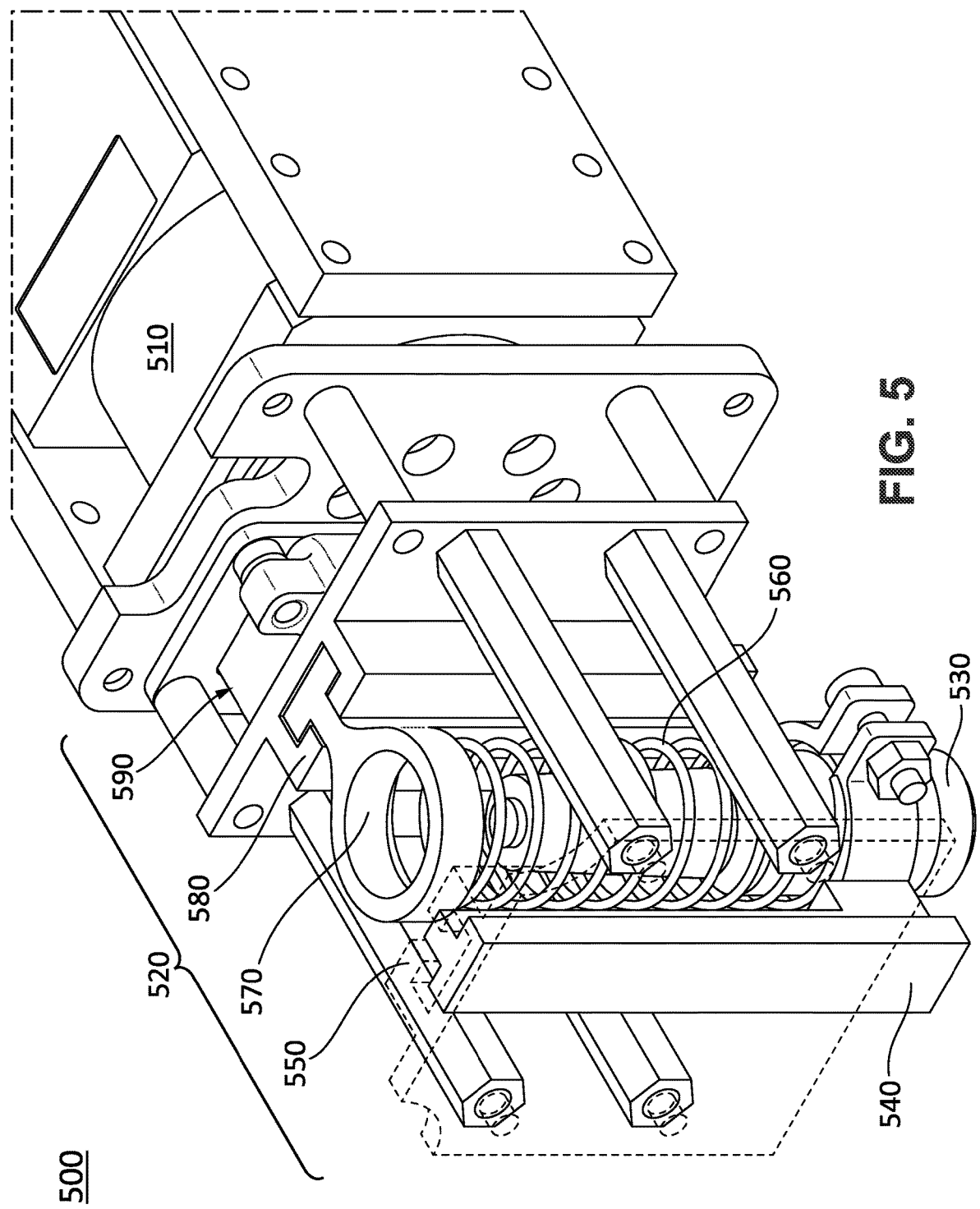
FIG. 5 is an oblique cutaway view of an example radial deployment mechanism, such as for use with the pipeline apparatus of FIG. 1, according to an embodiment.
Figure 6:
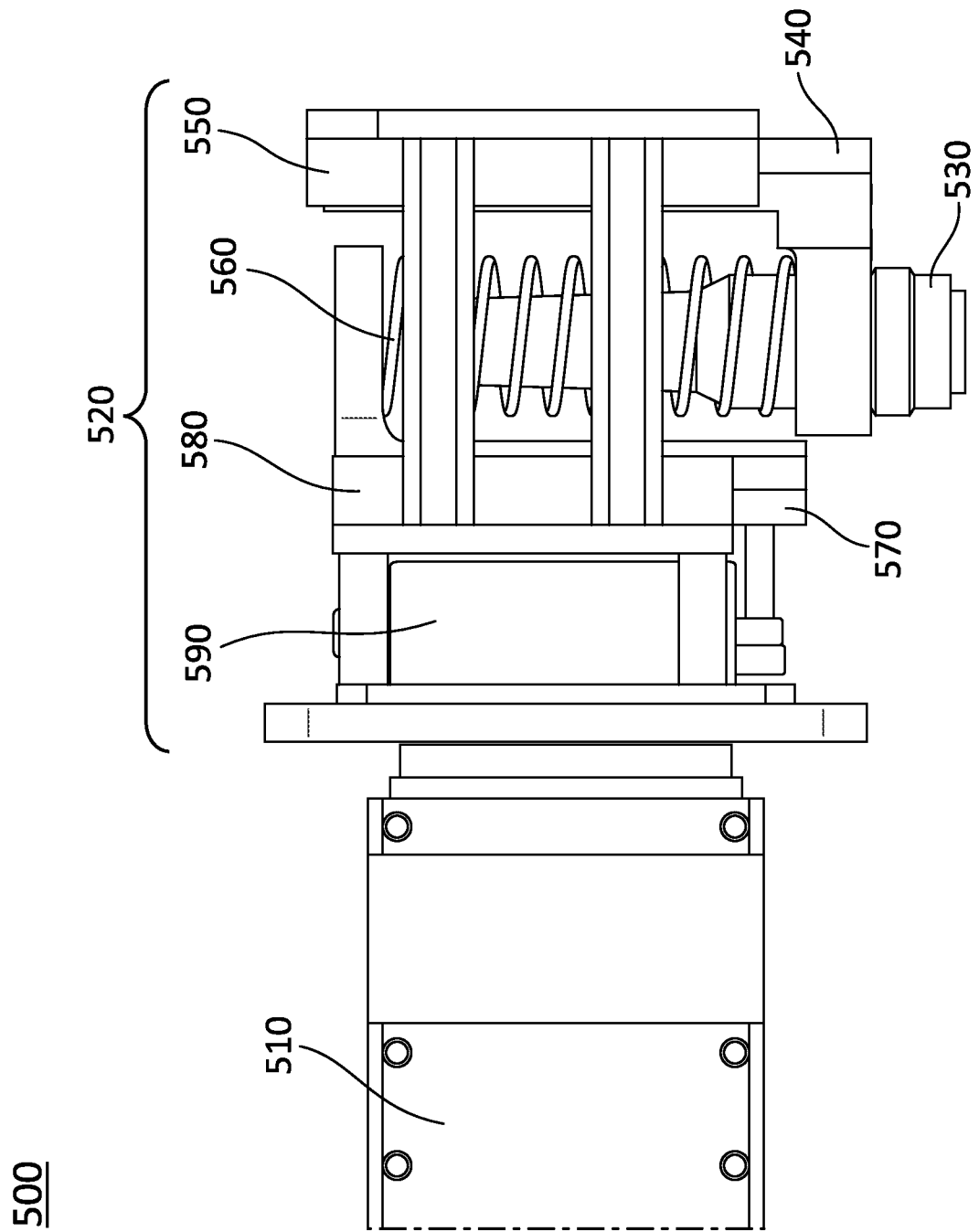
FIG. 6 is a cross-sectional view of the radial deployment mechanism of FIG. 5.

FIG. 5 is an oblique cutaway view of example rotational and radial deployment mechanisms 500, such as for use in deploying a probe or tool using the pipeline apparatus 100 of FIG. 1, according to an embodiment. FIG. 6 is a cross-sectional view of the rotational and radial deployment mechanisms 500 of FIG. 5. The illustrated deployment mechanism includes servo motor 510 for rotating a radial deployment mechanism 520 about an axis of rotation (e.g., aligned with the pipe axis by a passive centering mechanism as described elsewhere). The radial deployment can include, for example, rotating the radial deployment mechanism 520 to enable radial deployment of the probe or tool to a specific target point (e.g., specific angle of rotation) on the inside of the pipe.

Referring to FIGS. 5 and 6, the radial deployment mechanism 520 includes a probe 530 (such as a DFT probe) coupled or attached to a probe slider 540. For example, the probe slider 540 can be firmly attached to the probe 530 such that the two structures move as a unit. The probe slider 540 is configured to move radially along a (probe) linear guide 550. The probe slider 540 is also coupled to, attached to, or in contact with (or configured to contact) a spring 560, such as at one end of the spring 560. The spring can be a compression spring or a tension spring, depending on the embodiment. The other end of the spring 560 is coupled to, attached to, or in contact with (or configured to contact) a spring slider 570. For example, the spring slider 570 can be firmly attached to the other end of the spring 560 such that the spring slider 570 and the other end of the spring 560 move as a unit.

The spring slider 570 is configured to move radially along a (spring) linear guide 580 under the control of a linear actuator 590 which is coupled to the spring slider 570 and drives the spring slider 570 along the spring linear guide 580. As such, the coupling, attachment, or contact of the spring 560 and the probe slider 540 causes the probe slider 540 and the probe 530 to move concurrently, if not simultaneously, in the radial direction when the linear actuator actuates the spring slider 570 and its spring 560. Accordingly, the radial deployment mechanism 520 linearly actuates the spring slider 570 along the spring linear guide 580, to radially deploy the probe 530 in the radial direction until the probe 530 touches the target point on the inside wall of the pipe and the spring 560 exerts a desired amount of outward force on the probe 530 in the radial direction against the target point.

Briefly, the probe 530 is deployed and retracted to take measurements using the linear actuator 590 and the motor 510 that rotates the probe holder 540. The mechanism 520 includes the spring slider 570 that is actuated by the linear actuator 590 to push the spring 560. The spring 560 transfers the motion to the probe holder 540 which is linearly constrained using another slider 540 and linear guide 550 pair. The spring 560 also aids the deployment of the probe 530 and ensures that the probe 530 is pressed with the required force on the pipe wall to take reliable measurements. Thus, the combination of a passive adaptable centering mechanism and a consistent probe or tool deployment mechanism offers reliable results to deploy a probe or tool and account for the different pipes sizes.

Figure 7:
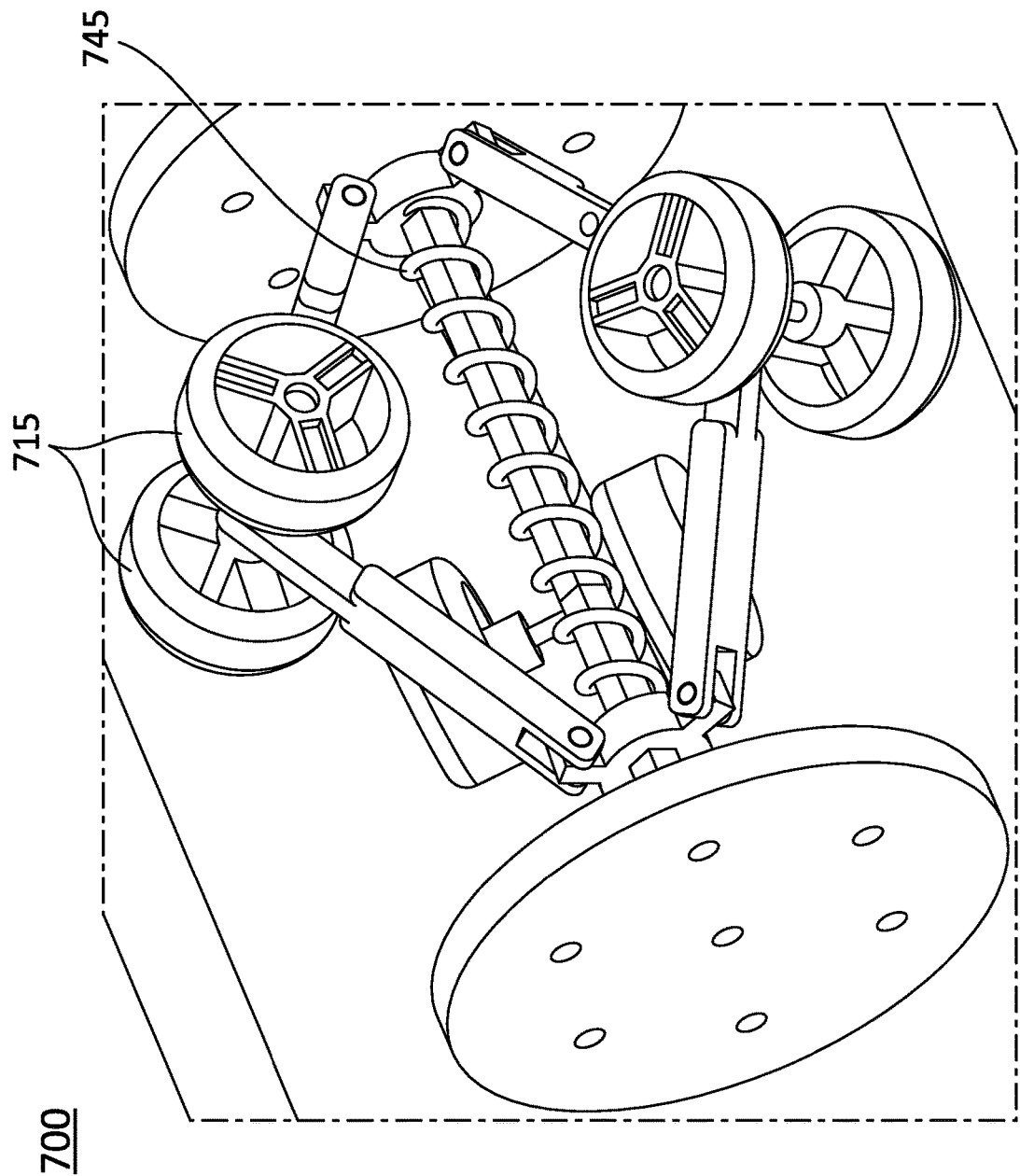
FIG. 7 is an oblique cutaway view of an example in-pipe passive centering mechanism, such as for use with the pipeline apparatus of FIG. 1, according to another embodiment.

FIG. 7 is an oblique cutaway view of an example in-pipe passive centering mechanism 700, such as for use with the pipeline apparatus 100 of FIG. 1, according to another embodiment. The centering mechanism 700 of FIG. 7 differs from that of FIGS. 2A-3 in several aspects. For one, the compression spring 240 is replaced with a tension spring 745 placed between the sliding rings (e.g., within the supporting links or legs, to inwardly contract the sliding rings). For another, the wheels 715 in the wheel sets of the centering mechanism 700 are arranged laterally (e.g., side-to-side), as opposed to longitudinally in the centering mechanism of FIGS. 2A-3. For yet another, the legs (or support links) in centering mechanism 700 are joined at the ends to a common axle for the two wheels 715 in each wheel set (and thus, there are no pivot points like the pivot points 230 in the centering mechanism of FIGS. 2A-3). Different embodiments are possible by combining different subsets of the previous embodiments, in order to establish a passive centering structure consistent with the present disclosure. As such, features such as the number, type, and location of springs in the pipeline apparatus can vary between embodiments.

For example, in the embodiment of FIG. 7, the centering mechanism 700 is pivoted at both ends of each of the support links such that one end pivots at the sliding ring and the other end pivots at the wheels 715. Before inserting the mechanism 700 inside the pipe, the wheels 715 are pushed to spread the legs (support links) to their maximum length position as the spring 745 applies tension to return to its original position. Once the mechanism 700 is inserted inside the pipe, the wheels 715 push the sliding rings, which stretches the spring 745. The stretched spring 745 provides the required force to keep the wheels 715 attached to the pipe walls and the module centered. Since the supporting members are all the same length for the three wheels (wheel sets), centering is achieved. In another embodiment, to achieve the centering using a similar mechanism to mechanism 700, the tension spring 745 is replaced with a compression spring placed outside one of the sliding rings.

Figure 8:
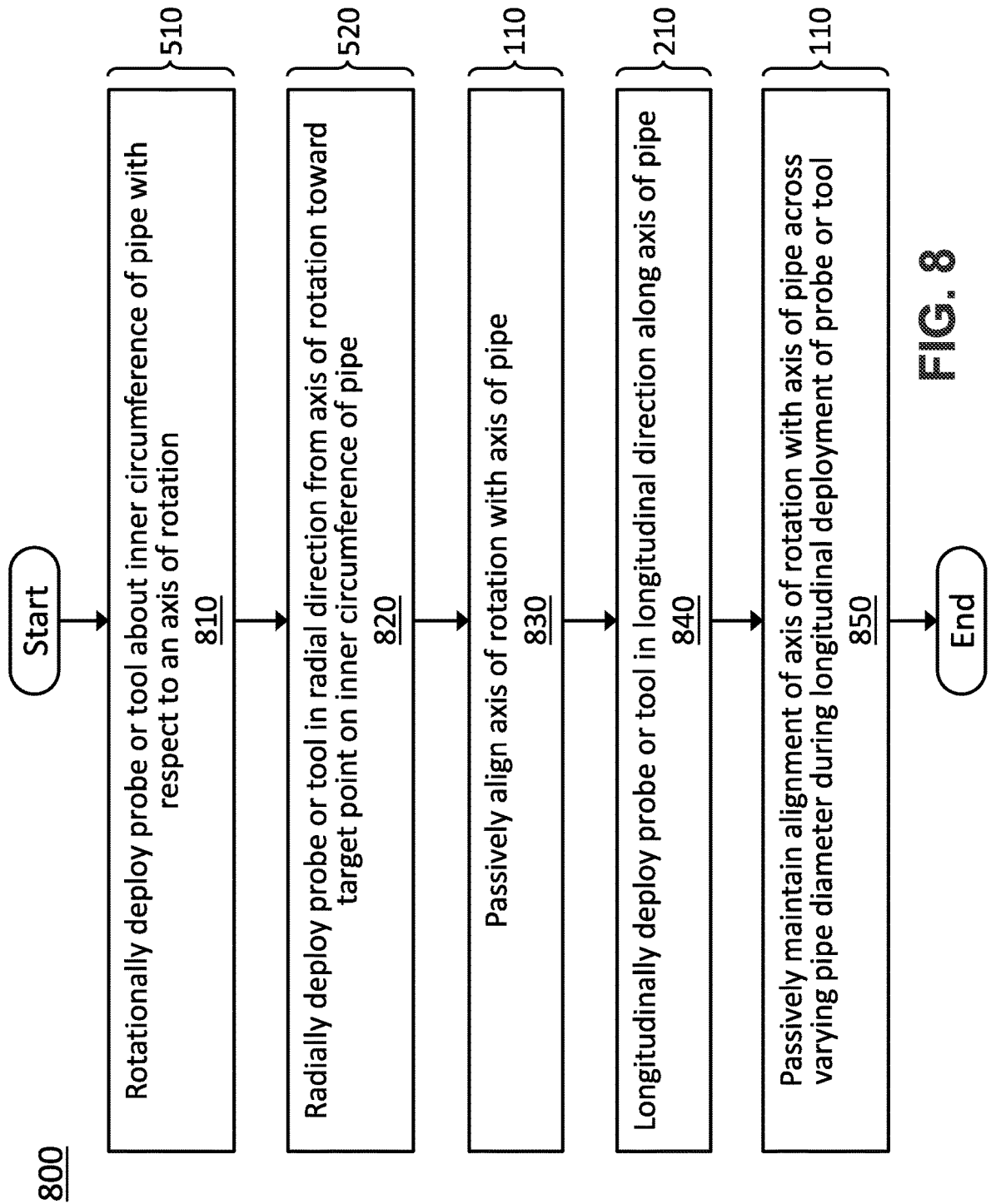
FIG. 8 is a flow chart of an example method of in-pipe inspection or maintenance of a pipe, according to an embodiment.

FIG. 8 is a flow chart of an example method 800 for in-pipe inspection or maintenance of a pipe, such as for use by the pipeline apparatus 100, according to an embodiment. Some or all of the method 800 can be performed using components and techniques illustrated in FIGS. 1-7. Portions of this and other methods disclosed herein can be performed on or using a custom or preprogrammed logic device, circuit, or processor, such as a programmable logic circuit (PLC), computer, software, or other circuit (e.g., ASIC, FPGA) configured by code or logic to carry out their assigned task. The device, circuit, or processor can be, for example, a dedicated or shared hardware device (such as a laptop, a workstation, a tablet, a smartphone, part of a server, or a dedicated hardware circuit, as in an FPGA or ASIC, or the like), or computer server, or a portion of a server or computer system. The device, circuit, or processor can include a non-transitory computer readable medium (CRM, such as read-only memory (ROM), flash drive, or disk drive) storing instructions that, when executed on one or more processors, cause portions of the method 800 (or other disclosed method) to be carried out. It should be noted that in other embodiments, the order of the operations can be varied, and that some of the operations can be omitted.

In the example method 800, processing begins with automatically rotationally deploying 810 a probe or tool about an inner circumference of the pipe with respect to an axis of rotation. This can be done, for example, using the servo motor 510 under control of corresponding electronics configured by code or logic to drive the servo motor 510 to rotate the tool or probe to the appropriate angle of rotation to deploy to a desired target point on the inner wall of the pipe. The method 800 further includes radially deploying 820 the probe or tool in a radial direction from the axis of rotation toward the target point on the inner circumference of the pipe. This can be done, for example, using the radial deployment mechanism 520. The method 800 also includes passively aligning 830 the axis of rotation with the axis of the pipe. This can be done, for example, using the passive centering mechanism 110.

In addition, the method 800 includes automatically longitudinally deploying 840 the probe or tool in a longitudinal direction along the axis of the pipe. The can be done, for example, using wheels 210, a motor, and control circuitry configured by code or other logic to drive the apparatus in the longitudinal direction to the appropriate longitudinal position to deploy the probe or tool. Further, the method 800 includes passively maintaining 850 alignment of the axis of rotation with the axis of the pipe across varying pipe diameters during the longitudinal deployment of the probe or tool. This can be accomplished, for example, using the passive centering mechanism 110.

The methods described herein may be performed in part or in full by software or firmware in machine readable form on a tangible (e.g., non-transitory) storage medium. For example, the software or firmware may be in the form of a computer program including computer program code adapted to perform some or all of the steps of any of the methods described herein when the program is run on a computer or suitable hardware device (e.g., FPGA), and where the computer program may be embodied on a computer readable medium. Examples of tangible storage media include computer storage devices having computer-readable media such as disks, thumb drives, flash memory, and the like, and do not include propagated signals. Propagated signals may be present in a tangible storage media, but propagated signals by themselves are not examples of tangible storage media. The software can be suitable for execution on a parallel processor or a serial processor such that the method steps may be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the scope of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing, and are not to be construed as limiting. However, it is recognized these terms could be used with reference to a viewer. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes may be made, and equivalents may be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The invention claimed is:

1. An in-pipe apparatus for pipe inspection or maintenance, the apparatus comprising:
   a rotational deployment mechanism configured to rotationally deploy a probe or tool about an inner circumference of a pipe with respect to an axis of rotation;
   a radial deployment mechanism configured to radially deploy the probe or tool in a radial direction from the axis of rotation toward a target point on the inner circumference of the pipe; and
   two passive centering mechanisms to passively align the axis of rotation with the axis of the pipe including a first passive centering mechanism at a first end of the in-pipe apparatus and a second passive centering mechanism is at a second end of the in-pipe apparatus, wherein the rotational deployment mechanism is arranged between the two passive centering mechanisms, wherein
   each of the passive centering mechanisms comprises legs and a spring,
   the legs are configured to make at least three points of contact with an inside wall of the pipe, and
   the spring is configured to exert outward force on the legs and against the inside wall of the pipe sufficient to passively align the axis of rotation with the axis of the pipe.

2. The apparatus of claim 1, further comprising a longitudinal deployment mechanism configured to longitudinally deploy the probe or tool in a longitudinal direction along the axis of the pipe.

3. The apparatus of claim 2, wherein
   a diameter of the pipe varies in the longitudinal direction, and
   the passive centering mechanism passively maintains alignment of the axis of rotation with the axis of the pipe across the varying pipe diameter during the longitudinal deployment of the probe or tool.

4. The apparatus of claim 1, wherein the rotational deployment mechanism comprises a motor to rotate the radial deployment mechanism about the axis of rotation.

5. The apparatus of claim 4, wherein
   the target point comprises a plurality of target points on the inner circumference of the pipe at a corresponding plurality of radial directions from the axis of rotation, and
   the rotational deployment mechanism is further configured to rotationally deploy the probe or tool to each of the radial directions while the passive centering mechanism passively maintains alignment of the axis of rotation with the axis of the pipe and the radial deployment mechanism radially deploys the probe or tool toward a corresponding one of the target points.

6. The apparatus of claim 1, wherein the radial deployment mechanism comprises:
   a first slider to hold the probe or tool;
   a first linear guide to linearly guide the first slider in the radial direction; and
   a linear actuator to linearly actuate the first slider along the first linear guide, to radially deploy the probe or tool in the radial direction.

7. The apparatus of claim 6, wherein the radial deployment mechanism further comprises:
   a spring held by the first slider at a first point of attachment;
   a second slider to hold the spring at a second point of attachment; and
   a second linear guide to linearly guide the second slider in the radial direction,
   wherein the linear actuator is further to linearly actuate the second slider along the second linear guide, to radially deploy the probe or tool in the radial direction until the probe or tool touches the target point and the spring exerts a desired amount of force on the probe or tool in the radial direction against the target point.

8. The apparatus of claim 7, wherein
   the linear actuator directly linearly actuates the second slider along the second linear guide, and
   the linear actuator indirectly linearly actuates the first slider along the first linear guide through compression or tension in the spring.

9. The apparatus of claim 1, wherein
   the legs comprise wheels to longitudinally deploy the probe or tool in a longitudinal direction along the axis of the pipe,
   a diameter of the pipe varies in the longitudinal direction, and
   the outward force exerted by the spring is further sufficient to passively maintain alignment of the axis of rotation with the axis of the pipe across the varying pipe diameter during the longitudinal deployment of the probe or tool.

10. The apparatus of claim 1, wherein each passive centering mechanism among the two passive centering mechanisms comprises:
    a longitudinal guide extending linearly along the axis of rotation,
    a first attachment ring,
    a second attachment ring coupled to the longitudinal guide, wherein one or more of the first attachment ring and second attachment ring are configured to slide linearly along the longitudinal guide, and
    at least three sets of legs that are spaced apart circumferentially about the axis of rotation, wherein each set of legs includes,
      a first leg pivotably coupled at a proximal end thereof to the first attachment ring and extending to a free end thereof,
      a second leg pivotably coupled at a proximal end thereof to the second attachment ring and extending to a free end thereof, wherein the first and second legs are pivotably coupled together at a pivot point between respective proximal ends and free ends, and
    wherein the at least three sets of legs are configured to make at least three points of contact with an inside wall of the pipe, and wherein the spring extends between the first and second attachment rings and is configured to exert an expansive force between the first and second attachment rings and thereby exert the outward force on the legs and against the inside wall of the pipe sufficient to passively align the axis of rotation with the axis of the pipe.

11. A method of in-pipe inspection or maintenance of a pipe using an in-pipe apparatus for pipe inspection or maintenance, the method comprising:

providing, the in-pipe apparatus for pipe inspection or maintenance, the in-pipe apparatus including,
  a rotational deployment mechanism configured to rotationally deploy a probe or tool about an inner circumference of a pipe with respect to an axis of rotation,
  a radial deployment mechanism configured to radially deploy the probe or tool in a radial direction from the axis of rotation toward a target point on the inner circumference of the pipe, and
  two passive centering mechanisms to passively align the axis of rotation with the axis of the pipe, including a first passive centering mechanism at a first end of the in-pipe apparatus and a second passive centering mechanism is at a second end of the in-pipe apparatus, wherein the rotational deployment mechanism is arranged between the two passive centering mechanisms,
    wherein each of the passive centering mechanisms comprises legs and a spring,
    the legs are configured to make at least three points of contact with an inside wall of the pipe, and
    the spring is configured to exert outward force on the legs and against the inside wall of the pipe sufficient to passively align the axis of rotation with the axis of the pipe;
automatically rotationally deploying the probe or tool about the inner circumference of the pipe with respect to the axis of rotation using the rotational deployment mechanism;
radially deploying, using the radial deployment mechanism, the probe or tool in the radial direction from the axis of rotation toward the target point on the inner circumference of the pipe; and
passively aligning the axis of rotation with the axis of the pipe, wherein passively aligning the axis of rotation comprises:
for each of the first passive centering mechanism and the second passive centering mechanism, making at least three points of contact with the legs against the inside wall of the pipe, and
exerting outward force with the spring on the legs and against the inside wall of the pipe sufficient to passively align the axis of rotation with the axis of the pipe.

12. The method of claim 11, further comprising automatically longitudinally deploying the probe or tool in a longitudinal direction along the axis of the pipe.

13. The method of claim 12, wherein
a diameter of the pipe varies in the longitudinal direction, and
passively aligning the axis of rotation comprises passively maintaining alignment of the axis of rotation with the axis of the pipe across the varying pipe diameter during the longitudinal deployment of the probe or tool.

14. The method of claim 11, wherein rotationally deploying the probe or tool comprises rotating the radial deployment mechanism about the axis of rotation using a motor.

15. The method of claim 14, wherein
the target point comprises a plurality of target points on the inner circumference of the pipe at a corresponding plurality of radial directions from the axis of rotation, and
rotationally deploying the probe or tool further comprises rotationally deploying the probe or tool to each of the radial directions while passively maintaining alignment of the axis of rotation with the axis of the pipe and the radial deployment mechanism radially deploys the probe or tool toward a corresponding one of the target points.

16. The method of claim 11, wherein radially deploying the probe or tool comprises:
holding the probe or tool with a first slider; and
linearly actuating the first slider in the radial direction along a first linear guide.

17. The method of claim 16, wherein radially deploying the probe or tool further comprises:
holding a spring with the first slider and with a second slider; and
linearly actuating the second slider in the radial direction along a second linear guide until the probe or tool touches the target point and the spring exerts a desired amount of force on the probe or tool in the radial direction against the target point.

18. The method of claim 17, wherein actuating the first and second sliders comprises:
directly linearly actuating the second slider along the second linear guide, and
indirectly linearly actuating the first slider along the first linear guide through compression or tension in the spring.

19. The method of claim 11, further comprising automatically longitudinally deploying the probe or tool in a longitudinal direction along the axis of the pipe using wheels that are part of the legs, wherein
a diameter of the pipe varies in the longitudinal direction, and
exerting the outward force with the spring is further sufficient to passively maintain alignment of the axis of rotation with the axis of the pipe across the varying pipe diameter during the longitudinal deployment of the probe or tool.

* * * * *